Dec. 29, 1964 R. GOMEZ 3,163,722

SHOULDER SUPPORT FOR TELEPHONE HANDSET

Filed March 7, 1961 4 Sheets-Sheet 1

INVENTOR.
RICARDO GOMEZ
BY
Irvine & Smiley
ATTORNEYS.

Dec. 29, 1964 R. GOMEZ 3,163,722

SHOULDER SUPPORT FOR TELEPHONE HANDSET

Filed March 7, 1961 4 Sheets-Sheet 2

INVENTOR.
RICARDO GOMEZ
BY Imirie & Smiley
ATTORNEYS.

Dec. 29, 1964 R. GOMEZ 3,163,722

SHOULDER SUPPORT FOR TELEPHONE HANDSET

Filed March 7, 1961 4 Sheets-Sheet 3

INVENTOR.
RICARDO GOMEZ

BY [signature]

ATTORNEYS.

INVENTOR.
RICARDO GOMEZ
BY
Imirie & Smiley
ATTORNEYS.

United States Patent Office 3,163,722

Patented Dec. 29, 1964

3,163,722

SHOULDER SUPPORT FOR TELEPHONE HANDSET

Ricardo Gómez, Monte de Piedad 15 Desp. 309, Mexico City, Mexico

Filed Mar. 7, 1961, Ser. No. 93,990
Claims priority, application Mexico, Mar. 8, 1960, 62,193
4 Claims. (Cl. 179—157)

This invention relates to a new and improved shoulder support for telephone handsets which renders users of the telephone who have need, at the same time, of taking shorthand dictation, receiving orders, making quick notes, and the like, free to employ their hands for such purposes, since with this support the hands are not needed to hold the telephone.

Apparatus for the same purpose is known, but the known devices suffer from many faults and after a few days of use, they are rejected.

The present invention is so constructed and arranged that its use is practical; it is easy to fit and to remove and its structure is very simple so that it is unnecessary to repair the device during its operative life which is of indefinite duration.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
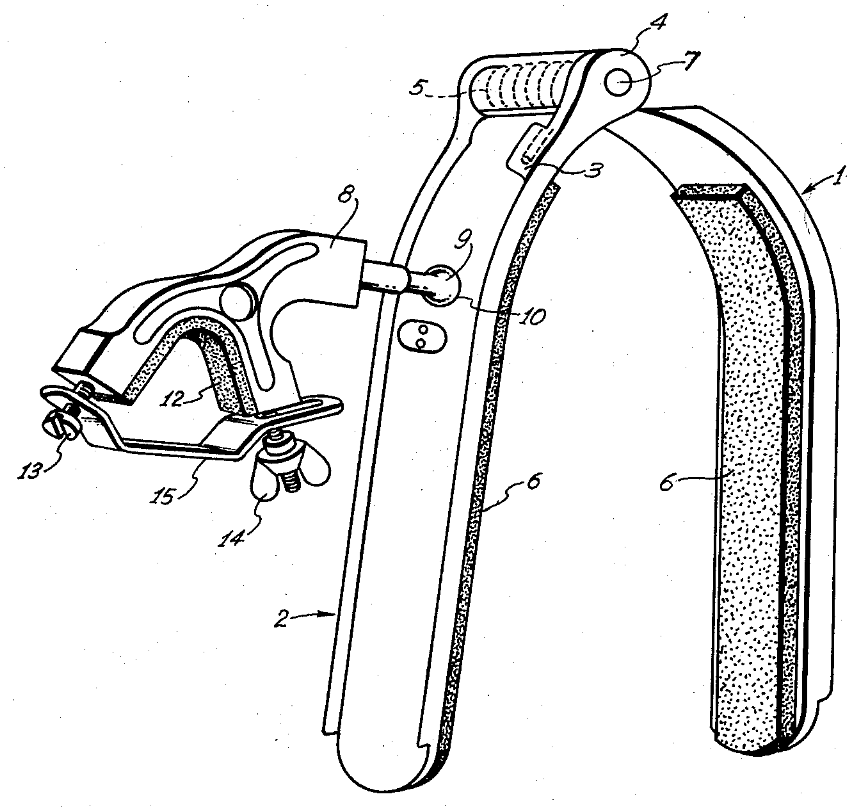
FIG. 1 is a perspective of a support for a telephone handset constructed according to the invention.
Figure 2:
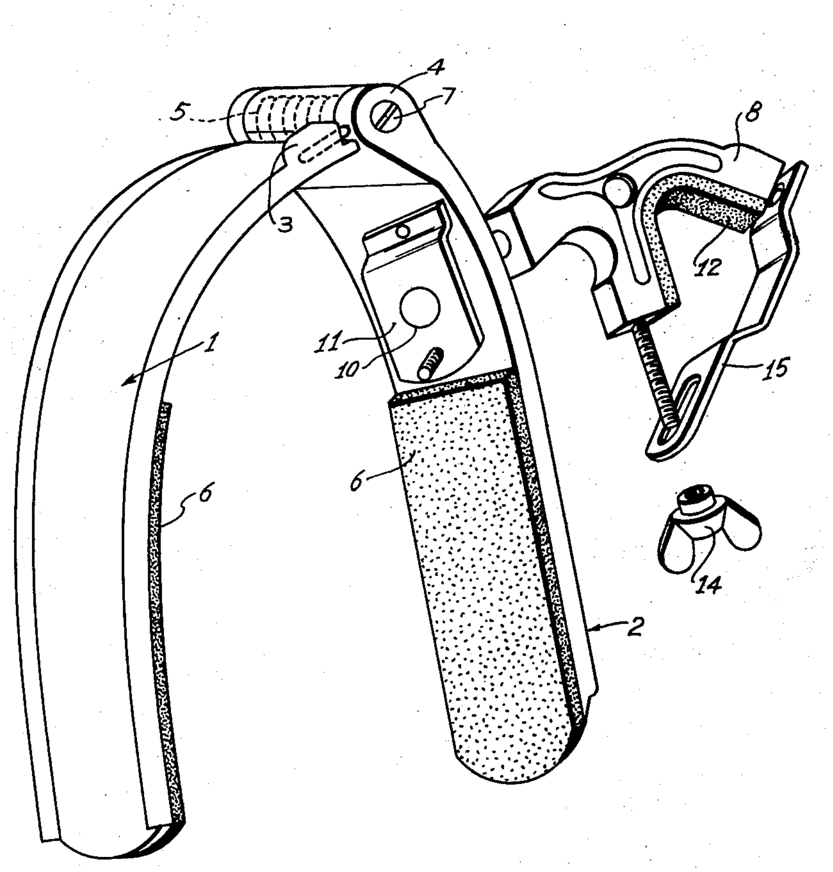
FIG. 2 is another perspective of the same apparatus seen from the opposite side.

Referring now to the drawings, in FIGS. 1 and 2 are shown in a lightweight support preferably manufactured from plastic material. If desired, it may be made in different colors. The support comprises two pieces, 1 and 2, or arms of a clamp, each having a slightly arched shape and together adapted to clamp on the shoulder of the person who uses the telephone. These pieces, 1 and 2, are provided in their edges with ribs for the purpose of giving more rigidity to the piece. The upper parts of the arms, where they articulate, have a shell 3 for shielding the tip of a spring 5, and above the shell is a hollow boss 4 in which is housed said spring of the clamp. The boss 4 is cut all along its length for the purpose of introducing the spring 5. Both arms 1 and 2 of the clamp in their inner sides are provided with a strip of sponge rubber 6 which prevent slipping of the clamp arms with respect to the shoulder of a wearer.

The steel spring 5 ends in two tips which are turned in opposite directions and which bear against the arms urging them toward each other to clamp on the shoulder of a wearer. The bolt 7 serves as axis to the clamp arms 1 and 2.

The forked piece 8 is specially shaped to embrace the arm of a telephone handset, and on one end it is fastened by means of a screw to a spindle or peg which passes through a perforation 10 in the arm 2 of the clamp. A sphere 9 at the other end of the spindle is located on the inner side of arm 2 where it is fastened by means of a slab or clamp plate 11 with a drill bore in its center and which drill bore gives pressure to the sphere by means of a screw.

The forked piece 8 on the side which contacts and cradles the arm of the handset is provided with a piece of sponge rubber 12. The handset is insertable between the fork arms and secured by means of bracket 15 and a pair of screws 13 and 14, the latter of which preferably has a butterfly nut. This structure allows the introduction of the arm of the handset in the piece 8 and thereafter tightening the screws firmly fastens the handset. The piece 8 can be pivoted to turn in all directions through the combination of the ball 9 and the clamp 11.

The present device described above may be used on the left or right shoulder depending on whether one wishes to hear with the left or right ear and according to the habit of the user. To shift from one shoulder to the other, one has only to half turn the fork piece 8 which supports the handset, loosen the bracket 15 and change the position of the handset.

Figure 3:
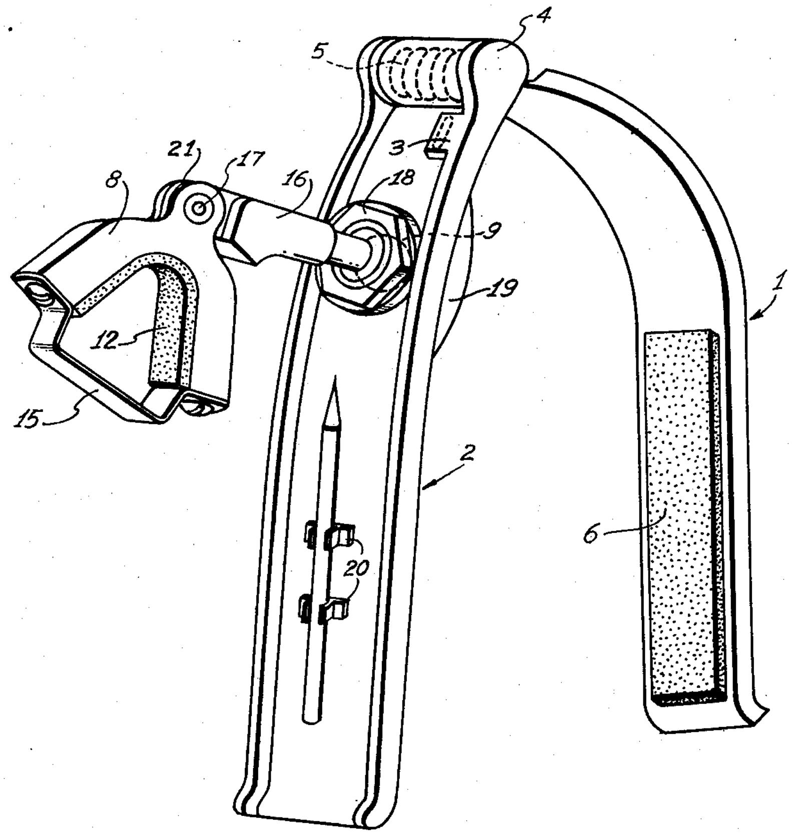
FIG. 3 is a view in perspective of a modified embodiment.
Figure 4:
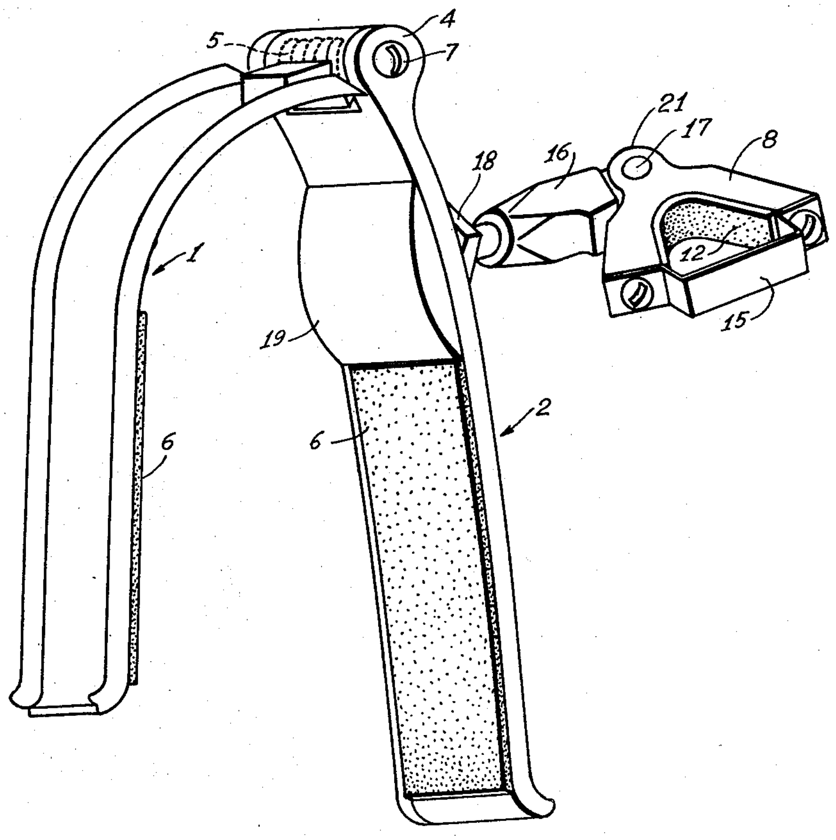
FIG. 4 is a perspective view of the device illustrated in FIG. 3 seen from the opposite side.

For the purpose of avoiding the need to make such change in the position of the handset upon shifting the device from one shoulder to the other, I have modified the described device in respect to the means for articulation of the fork piece 8 as illustrated in FIGS. 3 and 4.

According to this modification, the fork piece 8, in its upper part, ends in two separated and parallel ears 21. Between the ears a complementary part on the arm 16 is pivotally secured on a pivot 17 to form a butt hinge.

The arm 16 on its other end has a spindle terminating in sphere 9. The spindle as it passes through a hexagonal nut 18 is fastened by two burrs, or washers, of nylon fiber which give pressure to the sphere but permit a revolving movement in all directions, whilst the fork piece 8 together with the microphone of the telephone has a horizontal revolving movement around a substantially vertical axis, the bolt 7.

The means of fastening the telephone handset to the fork piece 8 have been modified slightly. A bracket 15 made of aluminum sheet has in its two ends oval drill bores for the screws which fasten it to the fork piece 8.

In the back part of the arm 2 a box 19 has been provided which gives space for and allows the movement of the sphere 9.

On the outer side of the arm 2 some clamp pieces 20 have been provided adjusted to removably secure a small pencil so the person using the telephone may easily remove the same for note taking.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A shoulder support for a telephone handset comprising a pair of rigid arms constructed from plastic material and each having a slightly arched shape, one of said arms having an opening therethrough, said arms being articulated together about a pivot at one of their ends, a spring coiled about said pivot and urging said pair of arms toward each other for clamping a shoulder of a wearer, a strip of sponge rubber affixed to the inner side of each said arms and covering only the lower portion thereof, a spindle having a ball at one end and passing through said opening in said one arm, means for clamping said ball rotatably under pressure against said arm having the opening, a forked member secured to the outer end of said spindle, and a bracket releasably secured across the arms of said forked member to retain a telephone handset clamped within said forked member.

2. A shoulder support for a telephone handset according to claim 1, wherein said clamping means comprises a plate having an opening therein and screw means for adjustably changing the pressure of the clamping plate on said ball, said ball being seated to bear against the walls of the openings in said arm and clamping plate respectively.

3. A shoulder support for a telephone handset according to claim 1 wherein said clamping means comprises a pair of nylon washers surrounding said spindle on either side of said arm and a threaded nut on said spindle adapted to adjust the pressure of said ball.

4. A shoulder support for a telephone handset according to claim 1 wherein said forked member is pivotally secured to said spindle and movable about a pivot axis substantially perpendicular to the axis of the spindle.

References Cited in the file of this patent

UNITED STATES PATENTS

| | | |
|---|---|---|
| 2,640,111 | Samsky et al. | May 26, 1953 |
| 2,644,043 | Zakos | June 30, 1953 |

FOREIGN PATENTS

| | | |
|---|---|---|
| 1,233,084 | France | May 2, 1960 |